(12) United States Patent
Goto

(10) Patent No.: US 12,047,779 B2
(45) Date of Patent: Jul. 23, 2024

(54) COMMUNICATION APPARATUS, METHOD OF CONTROLLING COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 367 days.

(21) Appl. No.: 17/194,078

(22) Filed: Mar. 5, 2021

(65) Prior Publication Data

US 2021/0195423 A1   Jun. 24, 2021

Related U.S. Application Data

(63) Continuation of application No. PCT/JP2019/034434, filed on Sep. 2, 2019.

(30) Foreign Application Priority Data

Sep. 13, 2018  (JP) .................................. 2018-171689

(51) Int. Cl.
*H04W 12/08*  (2021.01)
*H04W 12/03*  (2021.01)
(Continued)

(52) U.S. Cl.
CPC ........... *H04W 12/08* (2013.01); *H04W 12/03* (2021.01); *H04W 12/041* (2021.01);
(Continued)

(58) Field of Classification Search
CPC ..................................................... H04W 12/08
See application file for complete search history.

(56) References Cited

U.S. PATENT DOCUMENTS

| 7,536,548 B1 * | 5/2009 | Batke .................... H04L 63/061 |
| | | 713/168 |
| 9,307,387 B2 * | 4/2016 | Sakai .................... H04W 8/005 |

(Continued)

FOREIGN PATENT DOCUMENTS

| EP | 3534648 B1 * | 1/2022 | ............ H04W 48/10 |
| JP | 2005-286941 A | 10/2005 | |

(Continued)

*Primary Examiner* — Ponnoreay Pich
(74) *Attorney, Agent, or Firm* — Canon U.S.A., Inc. I.P. Dvision

(57) ABSTRACT

A communication apparatus receives a communication parameter for wireless communication with a first communication apparatus via a wireless network from a second communication apparatus, generates encryption key information to be shared with the first communication apparatus based on the received communication parameter, acquires an expiration date for connection to the wireless network from the received communication parameter, connects to the first communication apparatus via the wireless network using the generated encryption key information, and determines whether the acquired expiration date has passed and restricts connection to the first communication apparatus using the encryption key information in a case where the expiration date has passed.

20 Claims, 10 Drawing Sheets

(51) Int. Cl.
*H04W 12/041* (2021.01)
*H04W 12/0431* (2021.01)
*H04W 76/18* (2018.01)
*H04W 76/38* (2018.01)
*H04W 84/12* (2009.01)
*H04W 88/08* (2009.01)

(52) U.S. Cl.
CPC ....... *H04W 12/0431* (2021.01); *H04W 76/18* (2018.02); *H04W 76/38* (2018.02); *H04W 84/12* (2013.01); *H04W 88/08* (2013.01)

(56) References Cited

U.S. PATENT DOCUMENTS

| | | | |
|---|---|---|---|
| 10,169,587 B1* | 1/2019 | Nix | H04W 12/041 |
| 2011/0033052 A1* | 2/2011 | Yamada | H04L 9/3234 |
| | | | 380/270 |
| 2017/0295448 A1* | 10/2017 | McCann | H04W 12/04 |
| 2018/0278625 A1* | 9/2018 | Cammarota | H04L 9/3268 |
| 2021/0195423 A1* | 6/2021 | Goto | H04W 12/0431 |

FOREIGN PATENT DOCUMENTS

| | | |
|---|---|---|
| JP | 2011-040820 A | 2/2011 |
| JP | 2014-140101 A | 7/2014 |

* cited by examiner

FIG.5

| PMKID | MAC ADDRESS | PNK | PMK TYPE | EXPIRATION DATE |
|---|---|---|---|---|
| 12345678901234567890123456789012 | 65:55:55:44:33:22 | xx ⋯ xx | DPP | yy/mm/dd hh:mm:ss |
| ⋮ | ⋮ | ⋮ | PSK | N/A |
| ⋮ | ⋮ | ⋮ | 1X | N/A |
| | | | | |
| | | | | |
| | | | | |

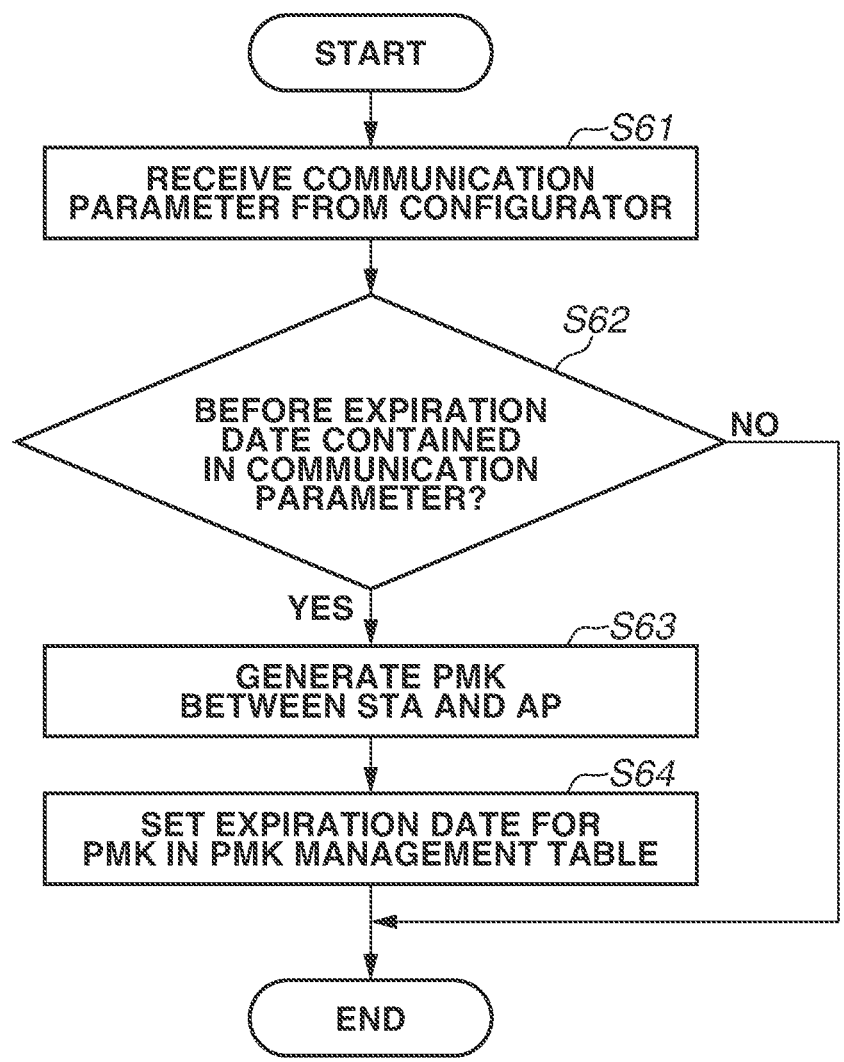

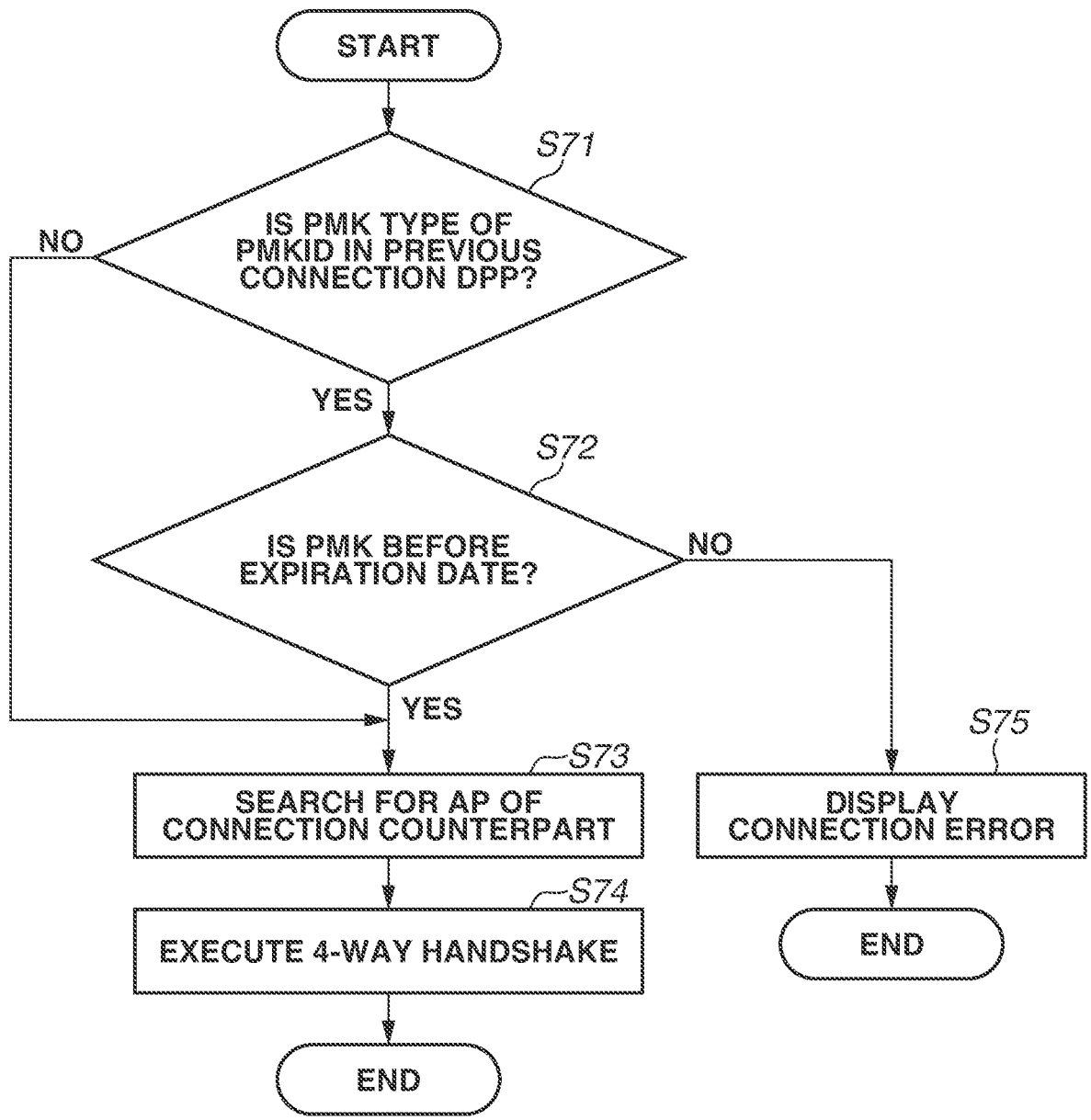

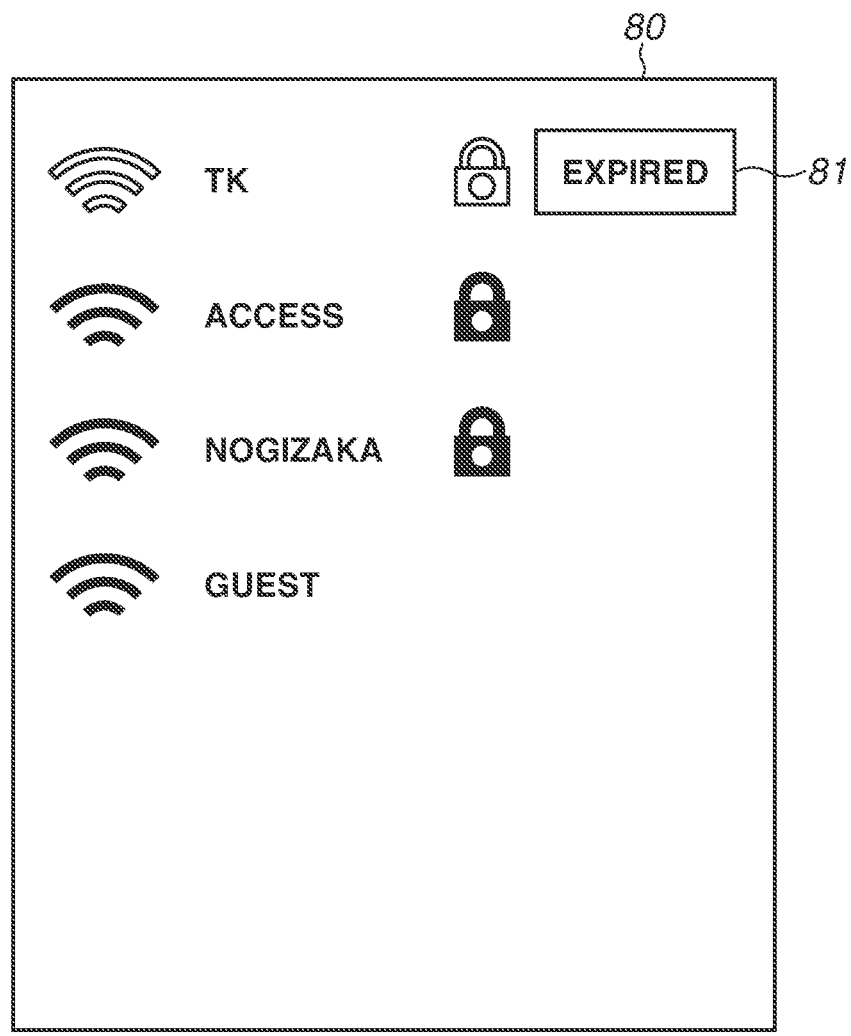

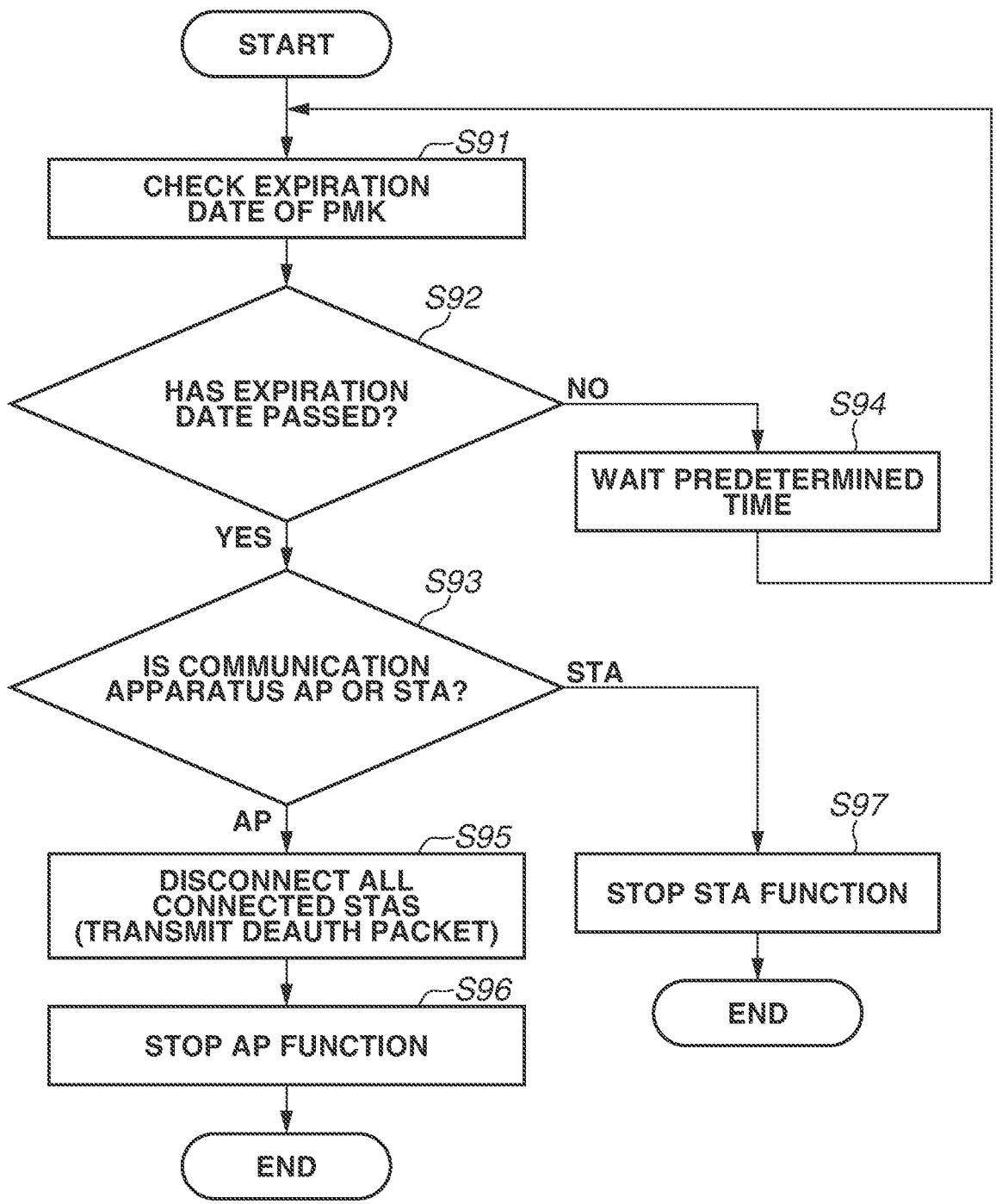

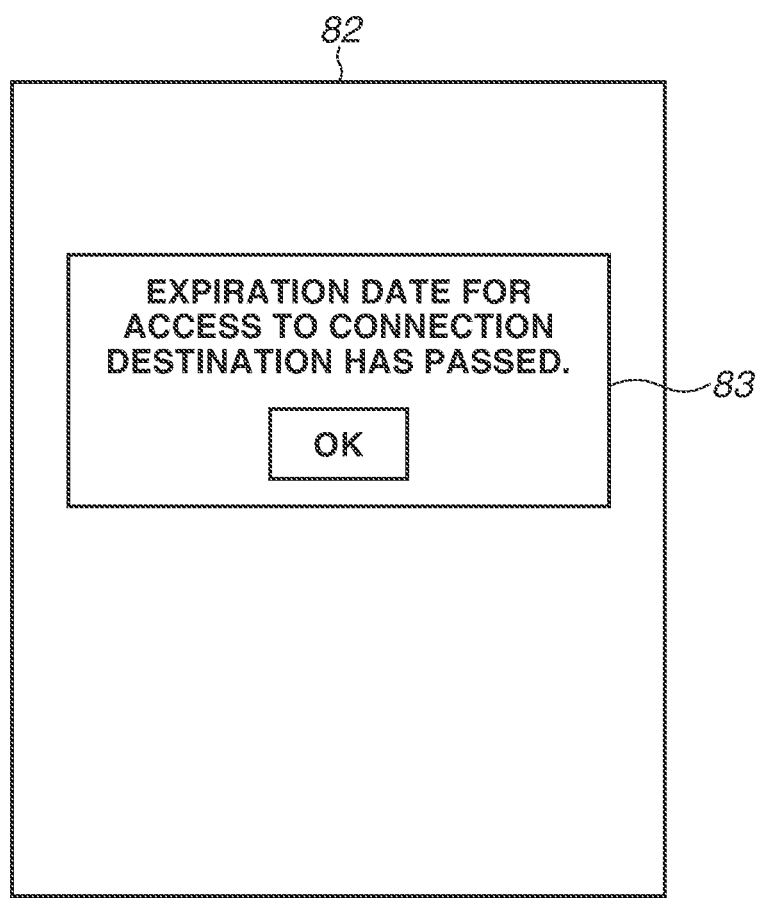

COMMUNICATION APPARATUS, METHOD OF CONTROLLING COMMUNICATION APPARATUS, AND NON-TRANSITORY COMPUTER-READABLE STORAGE MEDIUM

CROSS-REFERENCE TO RELATED APPLICATIONS

This application is a Continuation of International Patent Application No. PCT/JP2019/034434, filed Sep. 2, 2019, which claims the benefit of Japanese Patent Application No. 2018-171689, filed Sep. 13, 2018, both of which are hereby incorporated by reference herein in their entirety.

BACKGROUND OF THE INVENTION

Field of the Invention

The present invention relates to a communication apparatus connectable to a wireless network.

Background Art

In recent years, there have been an increasing number of cases where a wireless communication function is installed in an electronic device, such as a digital camera, a printer, a mobile phone, or a smartphone, and the electronic device is connected to a wireless network and used.

In order to connect the electronic device to the wireless network and to use it, various communication parameters for wireless communication, such as an encryption method, an encryption key, and an authentication key, are to be set to the electronic device. Wi-Fi Alliance Device Provisioning Protocol (hereinafter, referred to as "DPP") is developed as a technique that facilitates setting the communication parameters to an electronic device. In DPP, a user registers an electronic device by, for example, reading a QR code (registered trademark) of the electronic device to establish a secure connection to a wireless network.

In DPP, a configurator that provides communication parameters provides information necessary for connecting to an access point to an enrollee that is to receive the communication parameters and is to be registered in a wireless network, and the provided communication parameters are set to the enrollee.

Patent Document 1 discusses a wireless apparatus capable of executing provisioning using different provisioning methods by receiving a common managed object (CMO) from a configurator apparatus.

Specifically, the configurator apparatus discussed in Patent Document 1 transmits a CMO containing information indicating which of the different provisioning methods should be used to the wireless apparatus. The wireless apparatus having received the CMO determines a provisioning method to use based on the information contained in the CMO and executes provisioning using the determined provisioning method.

The enrollee that is to receive the communication parameters from the configurator is one of a station (hereinafter, referred to as "STA") and an access point (hereinafter, referred to as "AP") based on the Institute of Electrical and Electronics Engineers (IEEE) 802.11 standards.

After the communication parameters are provided from the configurator to each of the STA and the AP that are enrollees, the STA and the AP to be connected to each other first execute authentication processing between the STA and the AP. Next, a pairwise master key (hereinafter, referred to as "PMK") is to be defined between the STA and the AP as a pre-shared key on which an encryption key in communication between the STA and the AP is based.

When a link for connection between the STA and the AP is established after the PMK is pre-defined, a process such as a 4-way handshake is executed using the defined PMK to generate an encryption key for use in encryption in wireless communication between the STA and the AP. Since the encryption key for use in wireless communication is changed each time the STA and the AP are connected using the pre-defined PMK, the security strength of the wireless communication increases.

CITATION LIST

Patent Literature

PTL1: US-2017-0295448

Meanwhile, an expiration date for connection to a wireless network can be set to communication parameters provided from a configurator to an enrollee. However, a conventional PMK to be pre-shared by a station (STA) and an access point (AP) is not capable of holding information about the expiration date. Thus, once a PMK is defined between the STA and the AP, control using the expiration date provided from the configurator can no longer be executed thereafter.

The purpose of setting the expiration date using the communication parameters from the configurator is originally to temporarily permit an enrollee that is a communication parameter provision destination to join the wireless network and to not permit the enrollee to use the wireless network after the expiration date has passed. However, after a PMK is established between the enrollees (between the STA and the AP), the enrollee that is supposed to have expired may be permitted to connect to the wireless network almost permanently regardless of the set expiration date.

SUMMARY OF THE INVENTION

Various embodiments of the present disclosure provide a communication apparatus to which an expiration date for connection to a wireless network is set and that executes wireless communication with another communication apparatus as appropriate based on the set expiration date.

According to various embodiments of the present invention, a communication apparatus includes a reception unit configured to receive a communication parameter for wireless communication with a first communication apparatus via a wireless network from a second communication apparatus, a generation unit configured to generate encryption key information to be shared with the first communication apparatus based on the communication parameter received by the reception unit, an acquisition unit configured to acquire an expiration date for connection to the wireless network from the communication parameter received by the reception unit, a connection unit configured to connect to the first communication apparatus via the wireless network using the encryption key information generated by the generation unit; and a control unit configured to determine whether the expiration date acquired by the acquisition unit has passed and to control the connection unit to restrict connection to the first communication apparatus using the encryption key information in a case where the expiration date has passed.

Further features of the present invention will become apparent from the following description of exemplary embodiments with reference to the attached drawings.

BRIEF DESCRIPTION OF THE DRAWINGS

FIG. 5 is a diagram illustrating an example of a pairwise master key (PMK) management table to which a communication apparatus according to each exemplary embodiment refers.

FIG. 6 is a flowchart illustrating an example of a processing procedure of a process of generating and setting a pairwise master key (PMK) that is executed by a communication apparatus according to a first exemplary embodiment.

FIG. 7 is a flowchart illustrating an example of a processing procedure of a process of determining connection to another communication apparatus that is executed by the communication apparatus according to the first exemplary embodiment.

FIG. 8 is a diagram illustrating an example of a display screen that is displayed by the communication apparatus in a case where an expiration date of the PMK has passed according to the first exemplary embodiment.

FIG. 9 is a flowchart illustrating an example of a processing procedure of a process of checking an expiration date that is executed by a communication apparatus according to a second exemplary embodiment.

FIG. 10 is a diagram illustrating an example of a display screen that is displayed by the communication apparatus in a case where the expiration date of a PMK has passed according to the second exemplary embodiment.

DESCRIPTION OF THE EMBODIMENTS

Figure 1:
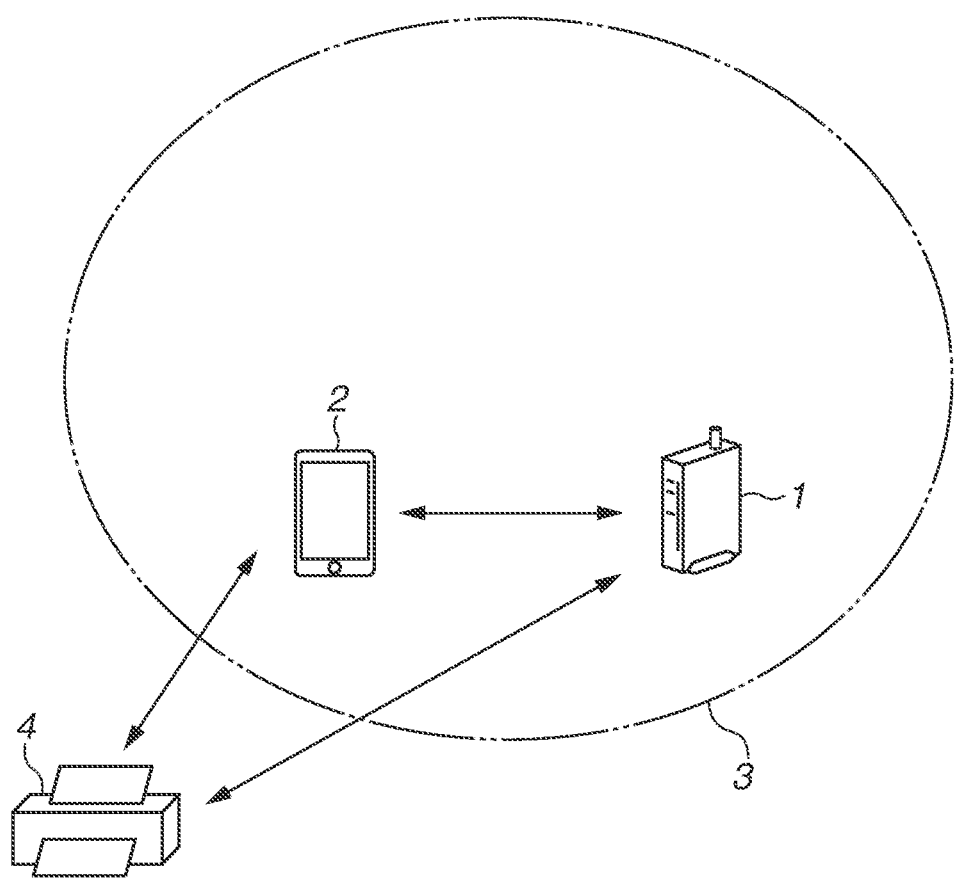
FIG. 1 is a diagram illustrating an example of a network configuration of a communication system according to each exemplary embodiment of the present invention.

Exemplary embodiments of the present invention will be described in detail below with reference to the attached drawings. The exemplary embodiments described below are mere examples of implementation of the present invention and should be modified or changed as appropriate depending on a configuration of an apparatus to which the present invention is applied and various conditions, and the present invention is not to be limited by the following exemplary embodiments. Further, not all the combinations of features described in the present exemplary embodiments are always essential to a technical solution of the present invention.

First Exemplary Embodiment

In the present exemplary embodiment, communication parameters necessary for wireless communication with a communication apparatus that is a communication counterpart via a wireless network are received from a communication apparatus that stores the communication parameters, and encryption key information to be shared with the communication apparatus that is a communication counterpart is generated based on the received communication parameters.

Further, in the present exemplary embodiment, an expiration date for connection to the wireless network is acquired from the provided communication parameters. Then, in the present exemplary embodiment, whether the acquired expiration date has passed is determined at the time of connecting to the communication apparatus that is a communication counterpart, and in a case where the expiration date has passed, connection to the communication apparatus that is a communication counterpart using the encryption key information is restricted.

This makes it possible to apply the expiration date set in the communication parameters provided from the communication apparatus storing the communication parameters necessary for wireless communication to the encryption key information to be shared with the communication apparatus that is a communication counterpart. Thus, the expiration date for connection to the wireless network that is set by the communication apparatus that provides the communication parameters is made valid for the connection to the communication apparatus that is a communication counterpart not via the communication apparatus that provides the communication parameters, and encrypted wireless communication using the expiration date as appropriate is realized.

In the present exemplary embodiment, a communication system using a wireless local area network (wireless LAN) system based on the Institute of Electrical and Electronics Engineers (IEEE) 802.11 series will be described as an example below. However, a communication form in the present exemplary embodiment is not necessarily limited to the IEEE 802.11 wireless LANs, and other communication forms can be employed.

Further, in the present exemplary embodiment, a communication apparatus that sets the communication parameters necessary for wireless LAN communication using Wi-Fi Alliance Device Provisioning Protocol (DPP) will be described as an example below. In DPP, a communication apparatus that stores the communication parameters necessary for wireless LAN communication functions as a configurator and provides the communication parameters to a communication apparatus. On the other hand, the communication apparatus to which the communication parameters are provided functions as an enrollee and generates encryption key information to be shared with another enrollee using a value contained in the provided communication parameters. The encryption key information can be a DPP pairwise master key (PMK). In wireless LAN communication, the enrollee can operate as one of an access point (AP) and a station (STA).

Network Configuration According to Present Exemplary Embodiment

FIG. 1 is a diagram illustrating an example of a network configuration of a communication system according to the present exemplary embodiment.

The communication system in FIG. 1 includes an access point 1, a smartphone 2, a wireless LAN network 3, and a printer 4.

The access point 1 is an AP that functions as a DPP enrollee and establishes the wireless LAN network 3 based on communication parameters provided by the smartphone 2.

The smartphone 2 functions as a DPP configurator and provides the communication parameters necessary for connection to the wireless LAN network 3 to an access point 1 and the printer 4, which are enrollees. The wireless LAN network 3 is a wireless LAN network established by the access point 1.

The printer 4 is an STA that functions as a DPP enrollee and connects to the access point 1 of the wireless LAN network 3 based on the communication parameters provided by the smartphone 2.

An example of a case where the printer 4 is to join the wireless LAN network 3 established by the access point 1 will be described below. The communication parameters for connection to the access point 1 are provided to the printer 4 by the smartphone 2.

While the access point 1, the smartphone 2, and the printer 4 are illustrated as communication apparatuses according to the present exemplary embodiment in the example illustrated in FIG. 1, the communication apparatuses can be any apparatuses capable of wirelessly communicating with another communication apparatus and are not limited to the illustrated apparatuses. The communication apparatuses can be other apparatuses such as a mobile phone, a camera, a personal computer (PC), a video camera, a smartwatch, and a personal digital assistance (PDA). Further, while three communication apparatuses are illustrated in FIG. 1, the number of communication apparatuses is not limited to three and can be two or four or more.

<Hardware Configuration of Communication Apparatus>

Figure 2:
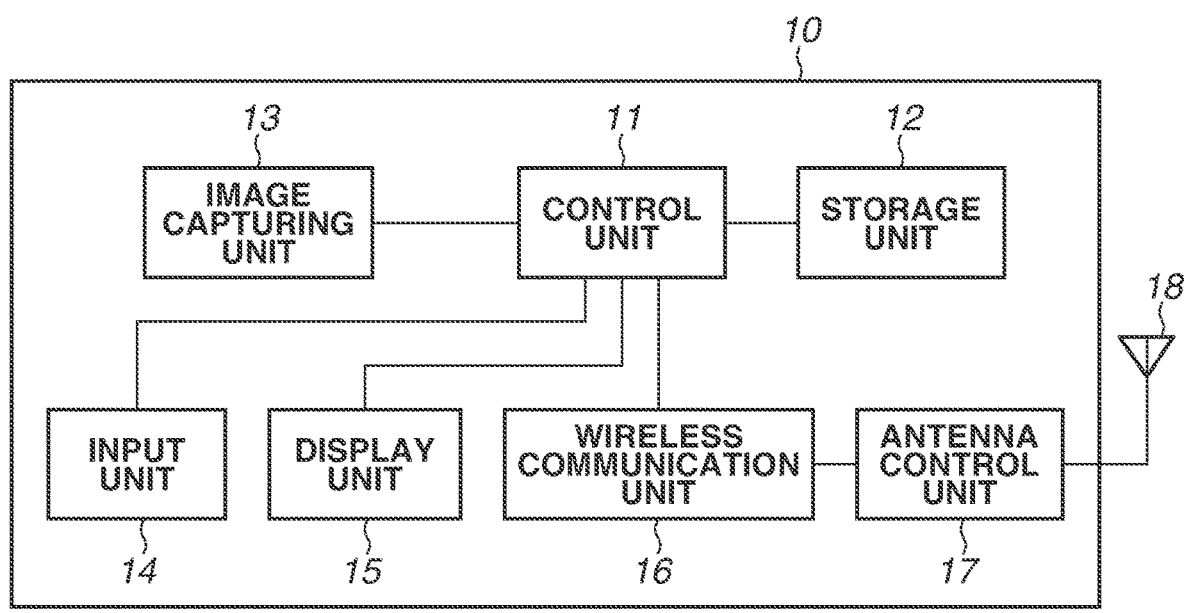
FIG. 2 is a diagram illustrating an example of a hardware configuration of a communication apparatus according to each exemplary embodiment.

FIG. 2 is a diagram illustrating an example of a hardware configuration of each communication apparatus according to the present exemplary embodiment.

In FIG. 2, a communication apparatus 10 includes a control unit 11, a storage unit 12, an image capturing unit 13, an input unit 14, a display unit 15, a wireless communication unit 16, an antenna control unit 17, and an antenna 18. The control unit 11, the storage unit 12, the image capturing unit 13, the input unit 14, the display unit 15, the wireless communication unit 16, and the antenna control unit 17 are communicably connected via a system bus.

The control unit 11 comprehensively controls operations in the communication apparatus 10 and controls the component units (12 to 17) via the system bus. Specifically, the control unit 11 loads a program that is necessary from the storage unit 12 and executes the program to thereby implement various functions and operations in executing various processes. The control unit 11 includes, for example, a central processing unit (CPU).

The storage unit 12 stores a control program to be executed by the control unit 11 and various types of data such as image data and the communication parameters. Various operations described blow are implemented by the control unit 11 executing the control program stored in the storage unit 12. The storage unit 12 functions as a main memory and a work area of the control unit 11 and can include a random access memory (RAM) that temporarily stores programs and data. The storage unit 12 can further include a read-only memory (ROM) that is a non-volatile memory for storing control programs and parameters that are needed to execute various processes by the control unit 11 and are not to be changed. The storage unit 12 can further include an external storage medium such as a hard disk drive (HDD), a flash memory, or a removable Secure Digital (SD) card.

The image capturing unit 13 includes an image sensor and a lens and captures images and moving images. In the present exemplary embodiment, the image capturing unit 13 captures images of barcodes, two-dimensional codes, and QR (registered trademark) codes.

The input unit 14 provides an input interface via which a user enters various types of input and operates the communication apparatus 10.

The display unit 15 executes various types of displaying and includes a function of outputting visually-recognizable information, such as a liquid crystal display (LCD) or a light emitting diode (LED). The display unit 15 can further include a function of outputting audio, such as a speaker.

The display unit 15 includes a function of outputting at least one of visual information and audio information.

In a case where visual information is to be displayed, the display unit 15 includes a video RAM (VRAM) that stores image data corresponding to the visual information to be displayed. The display unit 15 executes display control to continuously display the image data stored in the VRAM on the LCD or the LED.

The wireless communication unit 16 executes wireless LAN communication based on the IEEE 802.11 series. The wireless communication unit 16 can include a chip that executes wireless LAN communication.

The antenna control unit 17 controls output of the antenna 18.

The antenna 18 communicates using the 2.4 GHz band and/or the 5 GHz band for wireless LAN communication.

The configuration of the communication apparatus 10 in FIG. 2 is a mere example, and the communication apparatus 10 does not have to include all of the above-described modules, and an illustrated module can be omitted as needed.

For example, in a case where the communication apparatus 10 is the printer 4, the communication apparatus 10 can further include a printing unit in addition to the modules illustrated in FIG. 2. Further, in a case where the communication apparatus 10 is the access point 1, the communication apparatus 10 does not have to include, for example, the image capturing unit 13 and the display unit 15 among the modules illustrated in FIG. 2.

<Functional Configuration of Communication Apparatus 10>

Figure 3:
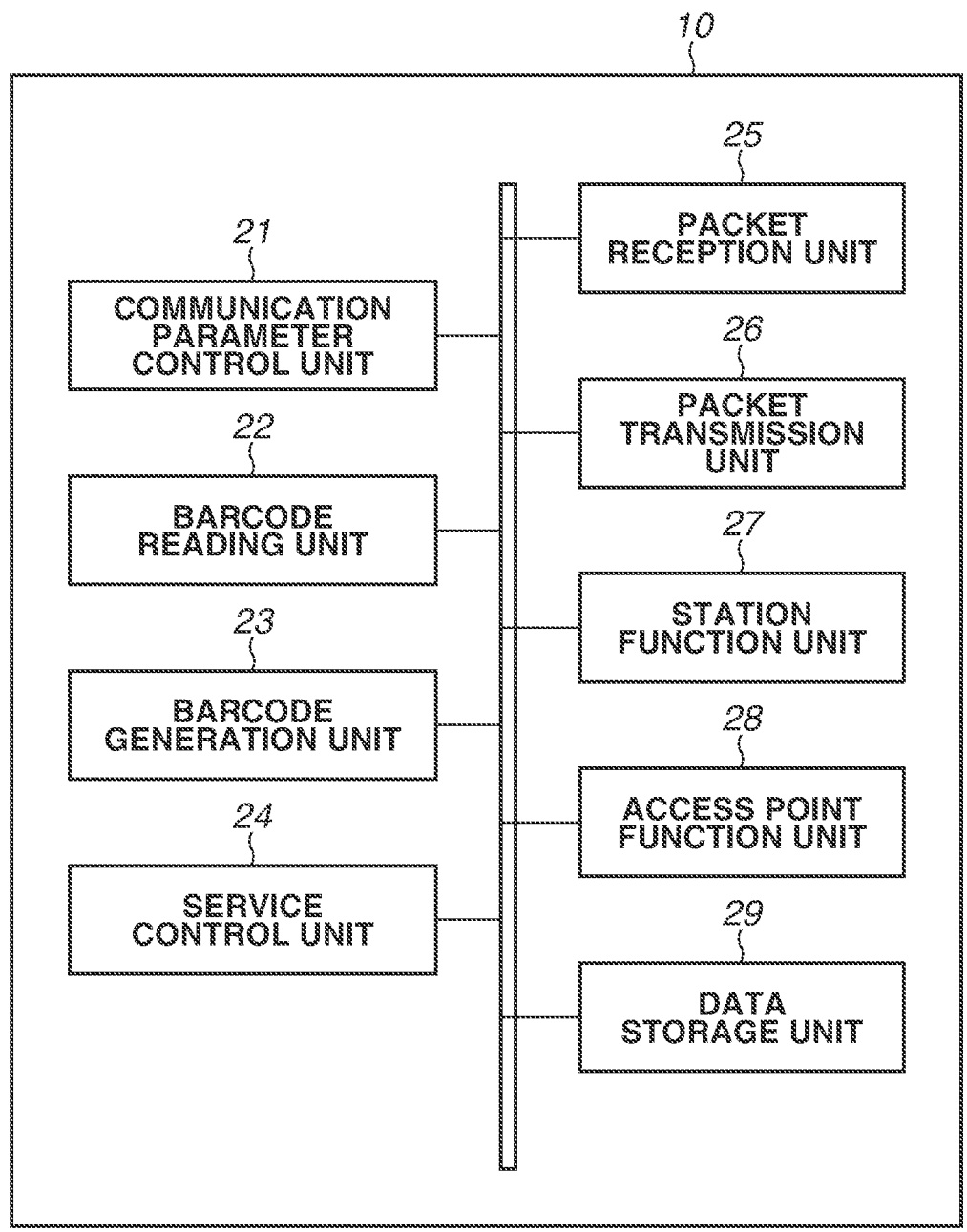
FIG. 3 is a block diagram illustrating an example of a functional configuration of a communication apparatus according to each exemplary embodiment.

FIG. 3 is a block diagram illustrating an example of a functional configuration of the communication apparatus 10 according to the present exemplary embodiment.

For a function of the function modules of the communication apparatus 10 in FIG. 3 that is to be implemented by software, a program for providing the function of the function modules is stored in a memory such as the storage unit 12, and the control unit 11 loads the program onto the RAM and executes the program to thereby implement the function. For a function that is to be implemented by hardware, for example, a dedicated circuit is automatically generated on an FPGA from a program for implementing the function of the function modules using a predetermined compiler. FPGA is the abbreviation for Field Programmable Gate Array. Alternatively, a gate array circuit can be formed to implement the function as hardware, similarly to the FPGA. Alternatively, the function can be implemented by an application-specific integrated circuit (ASIC). In this case, the dedicated hardware operates based on the control by the control unit 11.

The configuration of the function blocks in FIG. 3 is a mere example, and a single function block can include a plurality of function blocks, or one of the function blocks can be divided into blocks that execute a plurality of functions.

The communication apparatus 10 includes a communication parameter control unit 21, a barcode reading unit 22, a barcode generation unit 23, and a service control unit 24. The communication apparatus 10 further includes a packet reception unit 25, a packet transmission unit 26, a station function unit 27, an access point function unit 28, and a data storage unit 29. The communication apparatus 10 does not have to include all the modules in FIG. 3. Further, while the communication apparatus 10 in FIG. 3 can function as one of the station (STA) and an access point (AP) based on the IEEE 802.11 standards, the communication apparatus 10 can be configured to function as only one of the STA and the AP.

The communication parameter control unit 21 executes a communication parameter sharing process to share the communication parameters for wireless LAN communication between the communication apparatuses. In the communication parameter sharing process, the communication apparatus (configurator) that is to provide the communication parameters provides the communication parameters necessary for wireless LAN communication to the communication apparatus (enrollee) that is to receive the communication parameters. The provided communication parameters contain wireless communication parameters necessary for wireless LAN communication, such as a service set identifier (SSID) as a network identifier, an encryption method, an encryption key, an authentication method, and an authentication key. The provided communication parameters can further contain a DPP connector, a media access control (MAC) address, a pre-shared key (PSK), a pass phrase, an Internet Protocol (IP) address for communication on the IP layer, and information required for upper-layer services.

In the present exemplary embodiment. DPP is described as the communication parameter sharing process that is executed by the communication parameter control unit 21. The communication parameter sharing process that is executed by the communication parameter control unit 21 can be a process based on another protocol, such as Wi-Fi Protected Setup (WPS) or Wi-Fi Direct, and is not limited to DPP.

The barcode reading unit 22 analyzes an image of a two-dimensional code, such as a barcode or a QR code (registered trademark), that is captured by the image capturing unit 13 and acquires encoded information.

Specifically, in the present exemplary embodiment, the barcode reading unit 22 captures an image of code information, such as a QR code, containing a public key for use in execution of the communication parameter sharing process using the image capturing unit 13, and acquires the captured image. The code information to be captured can be a two-dimensional code, such as a Computer Purpose (CP) code or a QR code, or a one-dimensional code, such as a barcode.

In the present exemplary embodiment, the code information can contain information for use in the communication parameter sharing process. The information for use in the communication parameter sharing process contains information such as a public key for use in an authentication process and an identifier of the communication apparatus. The public key is information used to improve security in the communication parameter sharing process and can be information such as a certificate or a password. The public key is a type of an encryption key used in a public key encryption method.

The barcode generation unit 23 generates code information about a two-dimensional code such as a barcode or a QR code. The barcode generation unit 23 also controls the display unit 15 to display the generated two-dimensional code such as a barcode or a QR code. The code information generated by the barcode generation unit 23 contains information for use in execution of the communication parameter sharing process, such as a public key and an identifier of the communication apparatus.

The service control unit 24 executes an application on the application layer. The application layer corresponds to the service providing layer of the upper layers from Layer 5 and above in the Open Systems Interconnection (OSI) reference model (seven layers). Specifically, the service control unit 24 executes various application processes such as printing, image streaming, and file transferring, between the communication apparatuses via wireless communication using the wireless communication unit 16.

The packet reception unit 25 and the packet transmission unit 26 execute all the packet transmission and reception including communication protocols of the upper layers. Specifically, the packet reception unit 25 and the packet transmission unit 26 control the wireless communication unit 16 and execute the packet transmission and reception with another counterpart communication apparatus based on the IEEE 802.11 standards.

The station function unit 27 provides an STA function of operating as a station (STA) in an infrastructure mode defined in the IEEE 802.11 standards in which communication is performed via an access point (AP) that comprehensively controls the wireless network. The station function unit 27 executes an authentication process and an encryption process with the AP in operating as the STA.

The access point function unit 28 provides an AP function of operating as an access point (AP) in the infrastructure mode defined in the IEEE 802.11 standards. The access point function unit 28 forms a wireless network and executes a process, such as an authentication process, an encryption process, and a STA management process, on the STA.

The data storage unit 29 writes information, such as various types of software, communication parameters, and barcodes, to the storage unit 12 and reads the information from the storage unit 12.

In a case where the communication apparatus 10 mainly operates as the access point 1, for example, the barcode reading unit 22 and the station function unit 27 can be omitted.

<Sequence of Operations Between Communication Apparatuses of Communication System>

Figure 4:
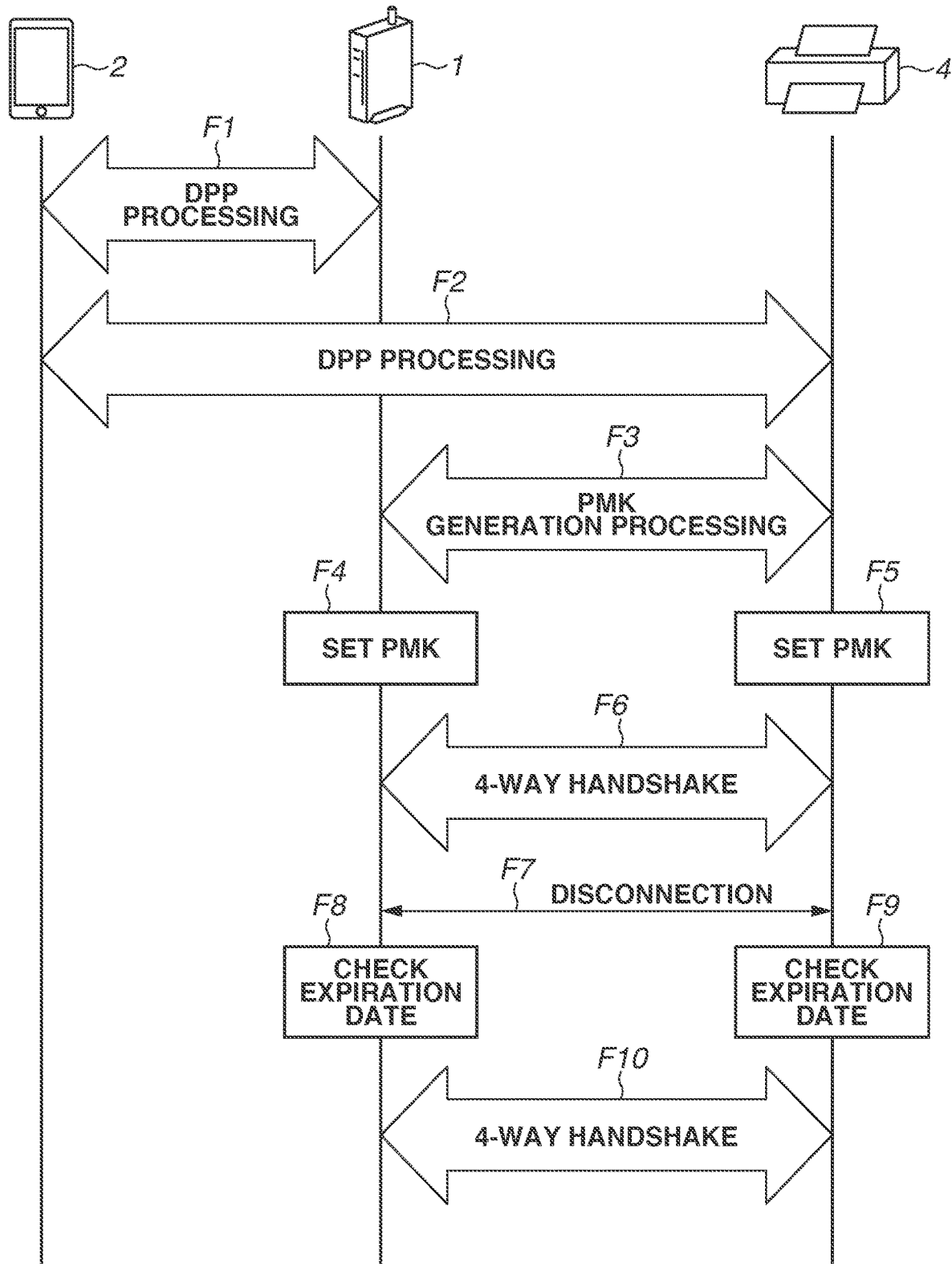
FIG. 4 is a diagram illustrating an example of a sequence of operations between communication apparatuses of a communication system according to each exemplary embodiment.

FIG. 4 is a diagram illustrating an example of a sequence of operations between the communication apparatuses of the communication system according to the present exemplary embodiment.

In FIG. 4, the access point 1 establishes the wireless LAN network 3, and the smartphone 2 stores the communication parameters for connection to the access point 1.

In a case where the access point 1 supports DPP, the smartphone 2 acquires the communication parameters using automatic setting using DPP. On the other hand, in a case where the access point 1 does not support DPP, an existing protocol such as Wi-Fi Protected Setup (WPS) or AirStation One-Touch Secure System (AOSS) (registered trademark) can be used.

A case where a wireless network is established using the access point 1 and the printer 4 as enrollees and the smartphone 2 as a configurator will be described below with reference to FIG. 4. The access point 1 is an AP, and the printer 4 is a STA.

The smartphone 2 being a configurator manages DPP communication parameter settings of all the devices on the wireless network.

In F1, the smartphone 2 first sets the communication parameters for the access point 1 based on DPP.

In F2, the smartphone 2 sets the communication parameters for the printer 4 based on DPP. Details of the communication parameter setting in F1 and F2 are as defined in the DPP specifications, so that detailed descriptions thereof are omitted.

As a result of F1 and F2, the process of setting the communication parameters for the two enrollees, the printer 4 and the access point 1, by the smartphone 2 being a configurator is completed. Details of the communication parameters set for the enrollees are discussed in, for example, Patent Document 1.

After the communication parameters are set for the access point 1 and the printer 4 in F1 and F2, in F3, a pairwise master key (PMK) is generated between the access point 1 and the printer 4 based on the set communication parameters. The PMK is a pre-shared key that is calculated to guarantee secure wireless LAN communication between the access point 1 and the printer 4, and the encryption key for use in wireless communication between the STA and the AP is based on the PMK.

The PMK generated in F3 is shared by the access point 1 and the printer 4, and in F4 and F5, the PMK is set to each of the access point 1 and the printer 4.

The PMK generated and set in F3 to F5 is set based on the DPP specification as described in the present exemplary embodiment. Alternatively, the PMK can be set based on the wireless LAN security standard referred to as Wi-Fi Protected Access (WPA)-Personal or WPA-Enterprise.

In a case where the PMK is to be set based on WPA-Personal, a user sets a pre-shared key (PSK), and the PSK set by the user can be directly used as the PMK. Further, in WPA-Personal, a PSK is calculated from the SSID and the pass phrase that is a character string of 8 to 63 letters, and the calculated PSK can be used as the PMK.

In WPA-Enterprise, a Remote Authentication Dial-in User Service (RADIUS) server distributes a PMK based on the IEEE 802.1X standards.

As described above, there are various types of a method of generating a PMK. Thus, the communication apparatus 10 according to the present exemplary embodiment stores a PMK management table defining information for PMK generation and manages the PMK information by referring to the PMK management table.

FIG. 5 is a diagram illustrating an example of a PMK management table stored in the communication apparatus 10.

A PMK management table 5 illustrated in FIG. 5 includes the following fields: a PMKID 51, a MAC address 52, a PMK 53, a PMK type (Type) 54, and an expiration date (Expiry) 55.

The PMKID 51 indicates a hash value that uniquely identifies the corresponding PMK, and detailed specifications of the PMKID 51 are based on the IEEE 802.11 standards. The MAC address 52 is a MAC address of a counterpart apparatus with which wireless communication is to be performed using the PMK specified by the PMKID 51. The PMK 53 indicates a value of the PMK generated between the communication apparatus 10 and the counterpart apparatus. The PMK type (Type) 54 indicates a method by which the PMK 53 specified by the PMKID 51 is generated. The PMK type 54 can be indicated as, for example, Authentication and Key Management (AKM) information. The PMK type 54 can be described using, for example, the values "DPP", "PSK", and "1X" to discriminate between a method of generation by DPP, a method of generation by WPA-Personal, and a method of generation by WPA-Enterprise, respectively.

The expiration date 55 sets the date and time until which the PMK 53 specified by the PMKID 51 is usable. As illustrated in FIG. 5, a value is set in the expiration date 55 only in a case where the PMK type 54 is DPP.

In the present exemplary embodiment, in a case where a PMK is generated by DPP, the communication apparatus 10 sets the expiration date for connection to the wireless network by the communication apparatus that is set in the communication parameters received from the configurator in the expiration date 55 of the PMK management table 5. Specifically, the PMK management table 5 stores the PMK generated by DPP in association with the expiration date set by the configurator.

Back to FIG. 4, in F4 and F5, the PMK for use between the access point 1 and the printer 4 is set, so that in F6, a 4-way handshake process defined in the IEEE 802.11i standard or the WPA standard is executed. The 4-way handshake process is executed using the pre-defined and pre-shared PMK so that an encryption key for use in wireless communication between the enrollees that are the access point 1 and the printer 4 is generated, and encrypted communication using the generated encryption key is enabled.

Next, after the 4-way handshake process in F6 is executed, in F7, the connection between the access point 1 and the printer 4 is disconnected during execution of the encrypted communication between the access point 1 and the printer 4.

In this case, in a subsequent process of re-connecting the access point 1 and the printer 4, a wireless LAN connection process is executed using the PMK set in F3 to F5.

Specifically, in F8 and F9, first, the printer 4 transmits a re-connection request containing the PMKID 51 of the PMK set in F5 to the access point 1. Before transmitting the re-connection request, the printer 4 refers to the PMK management table 5 managed in the printer 4, and in a case where the expiration date of the PMK generated by DPP has passed, the printer 4 can provide a connection error notification via the display unit 15 and can end the process. Alternatively, the printer 4 can notify the access point 1 that the expiration date of the PMK has passed.

The access point 1 having received the re-connection request containing the PMKID 51 of the PMK from the printer 4 refers to the PMK management table 5 in FIG. 5, and in a case where the PMK type 54 of the PMK specified by the PMKID 51 is generated by DPP, the access point 1 refers to the expiration date 55.

In a case where the PMK of the PMKID 51 contained in the re-connection request is a PMK generated by DPP and the expiration date 55 of the PMK is before the expiration date, in F10, the 4-way handshake process defined in the IEEE 802.11i standard or the WPA standard is executed.

Similarly, in a case where the PMK of the PMKID 51 contained in the re-connection request is generated by a method other than DPP and the expiration date 55 is not set for the PMK in the PMK management table 5, in F10, the 4-way handshake process defined in the IEEE 802.11i standard or the WPA standard is executed.

The 4-way handshake process is executed using the pre-defined and pre-shared PMK so that a new encryption key for use in communication between the enrollees that are the access point 1 and the printer 4 is re-generated, and encrypted communication using the re-generated encryption key is enabled.

Further, in a case where the PMK of the PMKID 51 contained in the re-connection request is a PMK generated by DPP and the expiration date 55 of the PMK has passed, the access point 1 restricts re-connection to the printer 4 and does not execute the 4-way handshake process. Details of the process in the case where the expiration date of the PMK has passed will be described below with reference to FIG. 7.

<Detailed Processing Flow of PMK Setting Process>

FIG. 6 is a flowchart illustrating an example of a detailed processing procedure of a process of generating and setting a PMK in F3 to F5 in FIG. 4.

In S61, the communication apparatus 10 that is an enrollee receives the communication parameters necessary for wireless communication from the configurator. The enrollees that receive the communication parameters are the access point 1 and the printer 4, and the configurator is the smartphone 2.

In S62, the communication apparatus 10 that is an enrollee acquires an expiration date contained in the communication parameters received in S61 and checks whether the expiration date has passed. In a case where the expiration date contained in the communication parameters received in S61 has passed (NO in S62), an authentication and PMK generation process between the enrollees in S63 is skipped, and the process is ended. On the other hand, in a case where the expiration date contained in the communication parameters received in S61 has not passed (YES in S62), the processing proceeds to S63.

In S63, the authentication and PMK generation process is executed between the enrollees that are the access point 1 (AP) and the printer 4 (STA).

Specifically, in the PMK generation process executed in S63, a PMK to be shared by the access point 1 and the printer 4 is calculated by a predetermined calculation method based on some elements of the communication parameters received from the configurator in S61. Specific details of the PMK calculation are described in the DPP specifications, so that redundant descriptions thereof are omitted.

In S64, the communication apparatus 10 that is an enrollee sets the PMKID 51, the MAC address 52 of the counterpart apparatus, and the PMK 53 as entries for the PMK calculated in S63 in the PMK management table 5. The communication apparatus 10 that is an enrollee further sets "DPP" in the PMK type 54 and sets the expiration date contained in the communication parameters received in step S61 in the expiration date (Expiry) 55 as entries for the PMK calculated in S63.

As a result of executing the processes from S61 to S64 described above, the information about the expiration date for connection to the wireless communication by the enrollees that is set by the configurator can be passed to the process of connecting wireless communication between the communication apparatuses that are enrollees.

<Detailed Processing Flow of Process of Connecting Enrollees>

FIG. 7 is a flowchart illustrating an example of a detailed processing procedure of a process of connecting the enrollees (the AP and the STA) in F8 to F10 in FIG. 4. An example of re-connecting the printer 4 (STA) that is the communication apparatus 10 to the access point 1 (AP) will be described below with reference to FIG. 7.

In S71, the printer 4 being an enrollee (STA) refers to the PMK type 54 (AKM information) in the PMK management table 5 using the PMKID 51 used in the previous connection to the access point 1 in executing the process of re-connecting to the access point 1 (AP).

In a case where the PMK type 54 of the PMKID 51 in the previous connection is DPP (YES in S71), the processing proceeds to S72, and whether the PMK is before its expiration date is determined. On the other hand, in a case where the PMK type 54 of the PMKID 51 in the previous connection is a method other than DPP (NO in S71), the processing skips S72 and proceeds to S73.

In S72, the printer 4 checks the expiration date (Expiry) 55 of the PMK by referring to the PMK management table 5 using the PMKID 51 in the previous connection as a key. In a case where the PMK is before the expiration date or an expiration date is not set (YES in S72), in S73, the printer 4 searches for an AP (the access point 1) of the connection destination. On the other hand, in a case where the expiration date of the PMK has passed (NO in S72), the processing proceeds to S75.

In a case where the presence of the AP is confirmed as a result of the search for the AP of the connection destination in S73, in S74, an authentication process and an association process are executed between the access point 1 (AP) and the printer 4 (STA) based on the IEEE 802.11 standards, and then the 4-way handshake process is executed.

Back to S72, in a case where the expiration date of the PMK has passed (NO in S72), in S75, the printer 4 displays a connection error on the display unit 15, and the process is ended without executing the process of re-connecting to the access point 1.

In the case where the display unit 15 displays the connection error in S75, the process can be re-executed from the communication parameter setting. As to a procedure of re-executing the communication parameter setting, a message to prompt a user to set the communication parameter setting can be displayed on the display unit 15, or communication with the configurator can be executed automatically without a user instruction to acquire the communication parameters.

FIG. 8 illustrates an example of a user interface of a Wi-Fi setting menu 80 displaying wireless LAN connection destination information about the communication apparatus 10. In FIG. 8, each displayed sector-shaped mark represents a wireless LAN, and an SSID is displayed to the right of the sector mark. In a case where the SSID is encrypted by Wired Equivalent Privacy (WEP)/WPA/Wi-Fi Protected Access 2 (WPA2)/DPP in wireless LAN communication, a lock mark is displayed corresponding to the SSID.

As described above in S75 in FIG. 7, in a case where the expiration date of the PMK has passed, the display unit 15 displays "expiration date has passed (expired)", and user input is restricted so that a wireless LAN connection destination 81 that has expired is not selectable. Alternatively, a user attempting to select the wireless LAN connection destination 81 that has expired may be prompted to set the communication parameters again.

Alternatively, information about a wireless LAN connection destination a PMK for which has expired can be deleted from options on the Wi-Fi setting menu 80, or information about an encryption key shared with a wireless LAN connection destination a PMK for which has expired may be deleted to exclude the wireless LAN connection destination from automatic/manual connection targets.

As described above, in the present exemplary embodiment, the communication apparatus acquires the expiration date for connection to the wireless network from the communication parameters provided by the configurator. Then, in connecting to another communication apparatus that is a communication counterpart, the communication apparatus determines whether the acquired expiration date has passed, and in a case where the expiration date has reached, connection to the communication apparatus that is a communication counterpart using the encryption key information is restricted.

This makes it possible to apply the expiration date set in the communication parameters provided from the configurator storing the communication parameters necessary for wireless communication to the encryption key information to be shared by the enrollees. Thus, the expiration date for connection to the wireless network that is set by the configurator is made valid also for the connection between the enrollees not via the configurator, and encrypted wireless communication using the expiration date as appropriate is implemented.

Second Exemplary Embodiment

The second exemplary embodiment will be described in detail below with reference to FIGS. 9 and 10, and only the differences from the first exemplary embodiment are described. In the example described in the first exemplary embodiment, after the communication parameter setting process and the PMK setting process based on DPP are executed, encrypted communication is executed using the wireless LAN, and the expiration date is checked at the time of re-connection. On the contrary, in the present exemplary embodiment, even if an event in which re-connection is to be executed has not occurred, the expiration date set for the PMK is periodically checked, and when the expiration date has passed, a notification thereof is provided to the user, and the wireless LAN communication is disconnected.

This makes it possible to make the expiration date for wireless network connection that is set by the configurator valid even during wireless communication connection between the enrollees not via the configurator, and the user can promptly recognize that the expiration date has passed.

A hardware configuration and a functional configuration of the communication apparatus 10 according to the second exemplary embodiment are similar to those according to the first exemplary embodiment illustrated in FIGS. 2 and 3.

A sequence of operations executed by the communication apparatus 10 according to the second exemplary embodiment is similar to that according to the first exemplary embodiment illustrated in FIG. 4.

<Detailed Processing Flow of Process of Checking Expiration Date of PMK According to Exemplary Embodiment>

FIG. 9 is a flowchart illustrating an example of a detailed processing procedure of a process of checking the expiration date of the PMK and disconnecting the wireless LAN communication that is executed by the communication apparatus 10 according to the present exemplary embodiment.

In S91, in a case where the expiration date is set for the PMK, the communication apparatus 10 that is an enrollee periodically refers to the PMK management table 5 and checks the expiration date 55 of the PMK that is currently used in wireless communication with a counterpart communication apparatus that is another enrollee.

In S92, in a case where the expiration date 55 of the currently-used PMK has not passed (NO in S92), the communication apparatus 10 waits a predetermined period of time in S94, and then the processing returns to S91 to repeat the process of checking the expiration date of the PMK.

On the other hand, in a case where the expiration date 55 of the currently-used PMK has passed (YES in S92), the processing proceeds to S93, and whether the communication apparatus 10 operates in an AP mode or in a STA mode on the wireless network is determined.

In S93, in a case where the communication apparatus 10 operates in the access point (AP) mode (AP in S93), the processing proceeds to S95, and all the STAs connected to the AP are disconnected. Specifically, in S95, the communication apparatus 10 transmits a deauth packet to the connected STAs to disconnect all the connected STAs.

In S96, after all the connected STAs are disconnected, the communication apparatus 10 stops the function of the communication apparatus 10 as an access point (AP). In S96, at the time of stopping the AP function, a notification that the network function (AP function) is to be ended can be provided to the user via the display unit 15.

On the other hand, in step S93, in a case where the communication apparatus 10 operates in the station (STA) mode (STA in S93), the processing proceeds to S97, and the communication apparatus 10 stops the function of the communication apparatus 10 as a station (STA).

In S97, for example, as illustrated in an example of a user interface 82 in FIG. 10, a display 83 of a notification that the expiration date for access to the connection destination has passed can be provided via the display unit 15, and a further notification that the network function is to be ended can be displayed. After the notifications are provided to the user, the communication apparatus 10 disconnects the connected AP and ends the operation of the communication apparatus 10 as a station (STA).

Alternatively, in the case where the communication apparatus 10 operates in the STA mode, while continuing to operate as a station (STA), the communication apparatus 10 can only display a notification that the expiration date of the PMK has passed on the display unit 15 and prompt the user to determine whether to disconnect from the network.

As described above, in the present exemplary embodiment, the communication apparatus 10 periodically checks the expiration date set for the PMK, and when the expiration date has passed, the communication apparatus 10 provides a notification thereof to the user and disconnects the wireless LAN communication.

This makes it possible to make the expiration date for wireless network connection that is set by the configurator valid even during wireless communication connection between the enrollees not via the configurator, and the user can promptly recognize that the expiration date has passed.

<Other Exemplary Embodiments>

In the examples described in the foregoing exemplary embodiments, an image (code information) such as a QR code image is read, and information for setting the communication parameters is transmitted and received between the communication apparatuses. Alternatively, instead of capturing an image of a QR code or the like, the communication parameters can be set using wireless communication such as near-field communication (NFC) or Bluetooth (registered trademark). Alternatively, wireless communication based on the IEEE 802.11ad standards or TransferJet (registered trademark) can be used.

In a case where a QR code is to be read, a QR code displayed on the display unit 15 as well as a QR code attached in the form of a sticker to a housing of a communication device can be read. Alternatively, a QR code attached to an instruction manual or a package or wrapping used when a communication device is sold can be read. Instead of a QR code, a one-dimensional barcode or a two-dimensional code other than a QR code can be read. Further, instead of machine-readable information such as a QR code, information in a form that can be read by a user can be read.

Further, while the examples in which the communication apparatuses execute IEEE 802.11-based wireless LAN communication have been described in the exemplary embodiments, the exemplary embodiments are not limited to those described above. Instead of the IEEE 802.11-based wireless LAN communication, for example, ultra-wideband (UWB) that is a short-range wireless communication method can be used to execute wireless communication using, for example, Wireless Universal Serial Bus (Wireless USB). Alternatively, wireless communication can be executed using a wireless communication method such as Bluetooth, ZigBec, or NFC. In UWB, wireless 1394 and WINET as well as Wireless USB can be used.

Further, while the examples in which the access point (AP) of the wireless LAN provides the communication parameters for wireless communication in the infrastructure mode have been described in the exemplary embodiments, the exemplary embodiments are not limited to those described above. In wireless communication not via an access point (AP), for example, a Wi-Fi Direct (registered trademark) group owner can provide the communication parameters for wireless communication.

Two or more of the above-described exemplary embodiments can be combined, or modifications can be made as needed, or applications thereof can be employed.

Further, the present invention can also be realized by a program that implements one or more functions of the above-described exemplary embodiments. Specifically, the present invention can be realized by a process in which the program is supplied to a system or an apparatus via a network or a storage medium and one or more processors of a computer (or a CPU or a micro-processing unit (MPU)) of the system or the apparatus reads the program and executes the read program. Further, the program can be recorded in a computer-readable recording medium and provided.

Further, the above-described exemplary embodiments are applicable to a system including a plurality of devices, such as a host computer, an interface device, an image capturing apparatus, and a web application, or to an apparatus including a single device.

Further, the present invention is not limited to the exemplary embodiments in which a function of the exemplary embodiments is implemented by executing a program read by a computer. For example, an operating system (OS) or the like running on a computer can actually execute a process partially or entirely based on an instruction of the program to implement a function of the above-described exemplary embodiments through the process.

In the above-described exemplary embodiments, a communication apparatus to which an expiration date for connection to a wireless network is set executes wireless communication with another communication apparatus as appropriate based on the set expiration date.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
one or more processors; and
one or more memories which store instructions executable by the one or more processors to cause the communication apparatus to perform at least operations comprising:
receiving a communication parameter for wireless communication from a first communication apparatus;
generating encryption key information to be shared with a second communication apparatus based on the received communication parameter;
acquiring an expiration date for the received communication parameter;
setting the acquired expiration date for the received communication parameter as an expiration date for performing communication connection with the second communication apparatus using the generated encryption key information;
connecting to the second communication apparatus using the generated encryption key information; and
controlling to restrict connection to the second communication apparatus using the encryption key information in a case where the set expiration date for performing communication connection with the second communication apparatus has passed.

2. The communication apparatus according to claim 1, the operations further comprising storing the generated encryption key information in association with the acquired expiration date, and
controlling to determines whether the set expiration date for performing communication connection with the second communication apparatus has passed by referring to the stored expiration date.

3. The communication apparatus according to claim 1, the operations further comprising, at the time of connecting to the second communication apparatus, generateing an encryption key from the encryption key information, the encryption key information generated in advance, and the encryption key encrypting the wireless communication with the second communication apparatus.

4. The communication apparatus according to claim 1, the operations further comprising, at the time of connecting to the second communication apparatus, determining whether the expiration date for performing communication connection with the second communication apparatus has passed, and in a case where the expiration date has passed, controlling to not connect to the second communication apparatus.

5. The communication apparatus according to claim 1, wherein whether the expiration date for performing communication connection with the second communication apparatus has passed is determined periodically, and in a case where the expiration date has passed, the communication apparatus performs control to disconnect the wireless communication with the second communication apparatus.

6. The communication apparatus according to claim 1, the operations further comprising, in a case where the expiration date for performing communication connection with the second communication apparatus has passed, controlling a display apparatus to display a notification that the expiration date for connection has passed, and restricting input to prevent the wireless network from being selected as a connection destination.

7. The communication apparatus according to claim 1, the operations further comprising, in a case where the expiration date for performing communication connection with the second communication apparatus has passed, controlling a display apparatus to not display an expired wireless network.

8. The communication apparatus according to claim 1, wherein the encryption key information is a pairwise master key (PMK) based on Institute of Electrical and Electronics Engineers (IEEE) 802.11 standards.

9. The communication apparatus according to claim 1, wherein the communication parameter is set from the second communication apparatus to the communication apparatus using Device Provisioning Protocol (DPP).

10. The communication apparatus according to claim 1, the operations further comprising, in a case where the communication apparatus operates as an access point (AP) based on the IEEE 802.11 standards, controlling to restrict the connection to the second communication apparatus so that the wireless communication with all second communication apparatuses connected to the communication apparatus is disconnected and a function of the access point is stopped.

11. The communication apparatus according to claim 1, the operations further comprising, in a case where the communication apparatus operates as a station (STA) based on the IEEE 802.11 standards, controlling a display apparatus to display a notification that the expiration date for connection to the wireless network has passed.

12. The communication apparatus according to claim 1, wherein the first communication apparatus is an enrollee in Device Provisioning Protocol (DPP), and the first communication apparatus is a configurator in DPP.

13. The communication apparatus according to claim 1, wherein the encryption key information is not generated in a case where the expiration date for the communication parameter is acquired from the communication parameter and the expiration date for the communication parameter has passed.

14. The communication apparatus according to claim 1, wherein an expiration date for performing the communication connection is set in a case where the communication parameter is a communication parameter received using DPP.

15. A method of controlling a communication apparatus, the method comprising:
receiving a communication parameter for wireless communication from a first communication apparatus;
generating encryption key information to be shared with a second communication apparatus based on the received communication parameter;
acquiring an expiration date for the received communication parameter;
setting the acquired expiration date for the communication parameter as an expiration date for performing communication connection with the second communication apparatus using the generated encryption key information;
connecting to the second communication apparatus using the generated encryption key information; and
restricting connection to the second communication apparatus using the encryption key information in a case where the set expiration date has passed.

16. The method according to claim 15, wherein the encryption key information is not generated in a case where the expiration date for the communication parameter is acquired from the communication parameter and the expiration date for the communication parameter has passed.

17. The method according to claim 15, wherein an expiration date for performing the communication connection is set in a case where the communication parameter is a communication parameter received using DPP.

18. A non-transitory computer-readable storage medium storing a computer program for causing a computer to execute a method of controlling a communication apparatus, the method comprising:
receiving a communication parameter for wireless communication from a first communication apparatus;
generating encryption key information to be shared with a second communication apparatus based on the received communication parameter;
acquiring an expiration date for the received communication parameter;
setting the acquired expiration date for the communication parameter as an expiration date for performing communication connection with the second communication apparatus using the generated encryption key information;
connecting to the second communication apparatus using the generated encryption key information; and
restricting connection to the second communication apparatus using the encryption key information in a case where the set expiration date has passed.

19. The non-transitory computer-readable storage medium according to claim 18, wherein the encryption key information is not generated in a case where the expiration date for the communication parameter is acquired from the communication parameter and the expiration date for the communication parameter has passed.

20. The non-transitory computer-readable storage medium according to claim 18, wherein an expiration date for performing the communication connection is set in a case where the communication parameter is a communication parameter received using DPP.

* * * * *